(12) United States Patent
Gebbie et al.

(10) Patent No.: US 9,577,296 B2
(45) Date of Patent: Feb. 21, 2017

(54) ELECTRIC VEHICLE BATTERY WITH SERIES AND PARALLEL FLUID FLOW

(75) Inventors: James George Gebbie, Rochester Hills, MI (US); Saravanan Paramasivam, South Lyon, MI (US); Brian Utley, Canton, MI (US); George Albert Garfinkel, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1476 days.

(21) Appl. No.: 13/313,519

(22) Filed: Dec. 7, 2011

(65) Prior Publication Data
US 2013/0149575 A1 Jun. 13, 2013

(51) Int. Cl.
| H01M 10/50 | (2006.01) |
| H01M 10/617 | (2014.01) |
| H01M 10/625 | (2014.01) |
| H01M 10/6568 | (2014.01) |
| H01M 10/6566 | (2014.01) |
| H01M 10/613 | (2014.01) |

(52) U.S. Cl.
CPC ......... *H01M 10/617* (2015.04); *H01M 10/613* (2015.04); *H01M 10/625* (2015.04); *H01M 10/6566* (2015.04); *H01M 10/6568* (2015.04)

(58) Field of Classification Search
None
See application file for complete search history.

(56) References Cited

U.S. PATENT DOCUMENTS

| 6,498,406 B1 | 12/2002 | Horiuchi et al. |
| 7,642,004 B2 | 1/2010 | Shimoyama |
| 2002/0028376 A1* | 3/2002 | Yamane ............. B60L 11/1874 429/120 |
| 2004/0180257 A1 | 9/2004 | Kimoto |
| 2013/0059180 A1* | 3/2013 | Yang ................... H01M 2/1077 429/72 |

FOREIGN PATENT DOCUMENTS

| CN | 201877543 U | 6/2011 |
| JP | 2003331933 A | 11/2003 |
| JP | 2004031716 A | 1/2004 |
| JP | 2008047325 A | 2/2008 |

OTHER PUBLICATIONS

Ahmad A. Pesaran, National Renewable Energy Laboratory, Battery Thermal Management in EVs and HEVs: Issues and Solutions, Advanced Automotive Battery Conference, Las Vegas, Nevada Feb. 6-8, 2001.
Chinese Patent and Trademark Office, First Chinese Office Action for the corresponding Chinese Patent Application No. 201210519487.5 dated Dec. 3, 2015.

* cited by examiner

*Primary Examiner* — Ula C Ruddock
*Assistant Examiner* — Tony Chuo
(74) *Attorney, Agent, or Firm* — David B. Kelley; Brooks Kushman P.C.

(57) ABSTRACT

A fluid cooled series/parallel battery pack is provided with a fluid flow system. A plurality of prismatic battery cells are arranged in parallel in two or more rows. Fluid flows in a series flow configuration from an upstream row of batteries to a downstream row of batteries. A bypass passageway provides additional fluid flow to an inner plenum located between the rows of batteries to reduce pressure drop and provide more uniform temperatures within the rows of battery cells.

7 Claims, 1 Drawing Sheet

ELECTRIC VEHICLE BATTERY WITH SERIES AND PARALLEL FLUID FLOW

TECHNICAL FIELD

This disclosure relates to controlling the temperature and pressure differentials in batteries used in electrically powered vehicles.

BACKGROUND

High voltage battery packs comprised of prismatic cells, such as lithium ion batteries, may be provided in arrays that require cooling for efficient operation. Battery packs may be arranged in several ways including a parallel configuration in which all of the prismatic cells are aligned to be parallel to each other. Parallel fluid cooled arrangements have a common inlet plenum that provides fluid to each cell and into a common outlet plenum without passing other cells. In a parallel arrangement, all of the cells are evenly cooled to minimize cell-to-cell temperature differences. Parallel arrangements are difficult to package because they result in increasingly elongated configurations as the required voltage increases. In addition, venting requirements may make a parallel design unfeasible.

In a series arrangement, fluid flows from an inlet plenum past several battery cells or banks of battery cells before flowing into an outlet plenum. Series arrangements can be more easily packaged because the battery cells can be placed in several rows. However, fluid flowing through one cell passes through other cells in a series arrangement of battery cells. This approach leads to uneven cooling and large pressure drops across sequential rows.

Semi-parallel designs include batteries that arrange some battery cells in parallel and some in series in multi-row configurations. The minimum number of rows is two, but even this minimal number of rows may be adversely affected by excessive row-to-row pressure drop and cell-to-cell temperature differences from one row to another.

This disclosure addresses the above problems and limitations relating to battery cell arrangements and other problems as summarized below.

SUMMARY

A series/parallel bypass configuration of a heat transfer fluid is proposed to manage problems of pressure drop and temperature differentials across a battery pack. The heat transfer fluid may be liquid or gaseous. In the majority of battery packs air is the heat transfer medium and in this application some references are made to air, however, it should be understood that the principles underlying the concept are applicable to other heat transfer fluids.

In the disclosed system, some of the fluid flow passes through a first row of prismatic battery cells while some of the fluid flow for a second row of cells bypasses the first row and mixes with the flow from the first row in a plenum. Fluid supplied to the second or subsequent rows is a mixture of fluid received from the first row and fluid received from a bypass fluid supply. This arrangement provides more even temperature distribution between the first and second rows. Battery packs with three or more rows may also incorporate the disclosed concept.

Prismatic batteries require heating or cooling for optimal operation. If a battery is too cold, it will not operate efficiently. If a battery is too hot, problems may be encountered that relate to overheating. A heat transfer fluid may be circulated within a battery to warm a battery that is too cold or cool a battery that is overheated. Ideally, a plurality of prismatic battery cells are kept at an isothermal temperature that is controlled for efficient operation by a circulating heat transfer fluid.

With the series/parallel bypass approach, pressure drop is decreased because all of the fluid flow required for cooling the battery pack does not pass through the first row. Additional fluid flow through a bypass passageway into an inner plenum reduces the extent of pressure drop between rows. Pressure drop normally associated with a series arrangement of prismatic battery cells is mitigated by the series/parallel configuration.

According to one aspect of the disclosure, a battery for a vehicle is provided that comprises a first row of battery cells, a second row of battery cells parallel to the first row, and an inner plenum between the first and second rows. Fluid flow channels are defined between the battery cells in each of the rows with fluid flowing longitudinally and sequentially through the first row, the inner plenum, and the second row. Additional fluid flow is supplied from the bypass passageway through the inner plenum to the second row.

According to another aspect of the disclosure, the battery comprises a first row of spaced battery cells defining a first fluid flow path and a second row of spaced battery cells that define a second fluid flow path. A bypass fluid flow path circumvents the first row and is provided to an inner plenum defined between the first and second rows. The cross-sectional area of the bypass fluid flow path may be changed to increase or decrease the volume of bypass fluid flowing into the inner plenum. The inner plenum receives fluid from the first fluid flow path and the bypass fluid flow path that is provided to the second row of battery cells. The volume of the inner plenum is a design parameter that may be changed to control mixing the fluid in the first fluid flow path with the fluid in the bypass fluid flow path.

According to yet another aspect of the disclosure, a battery system for an electric vehicle is provided that comprises an upstream row of a plurality of battery cells that extends transversely relative to the vehicle and a downstream row of the plurality of battery cells that extends transversely relative to the vehicle with spaces defined between the battery cells. A fluid inlet admits fluid into the spaces between the upstream row of battery cells. An inner plenum is provided between the upstream and downstream rows of battery cells that receives fluid from the upstream row of battery cells and provides fluid to the downstream row of battery cells. A bypass fluid flow path is provided on one side of the upstream row of battery cells that does not flow through the spaces between the upstream row of battery cells. The bypass fluid flow path provides a second part of the fluid flow through and into the inner plenum. A blocker restricts the bypass fluid flow path from flowing around the downstream row of battery cells. The first and second parts of the fluid flow are directed to flow through the spaces defined between the battery cells in the downstream row of battery cells and to an outlet.

According to further aspects of the above concepts, the battery cells may be planar members that extend in the vertical and longitudinal planes with the fluid flow channels being defined on two planar sides of the battery cells. The additional fluid flow may be separated from the fluid flow channels by a partition on one side of the first row of battery cells. The additional fluid flow may be directed from below the first row of battery cells into the inner plenum by the blocker that is disposed below the second row of battery cells. Fluid flowing through the first row of battery cells transfers heat to or from the battery cells in the first row and supplies fluid to the inner plenum that is combined with the additional fluid flow that mixes the fluid flows before flowing through the second row of battery cells.

According to a more specific description of the illustrated embodiment, a top wall may be provided on top of the first and second rows of battery cells that prevents fluid flow vertically through the battery cells. A bottom wall may be provided below the first row of battery cells that prevents fluid flow vertically through the first row of battery cells.

A bypass blocker may be provided below the second row of battery cells that directs the additional fluid flow through the inner plenum and the second row of battery cells by stopping the flow of the additional fluid below the second row of battery cells. A fluid flow exhaust opening, or outlet, may be provided that is open to the spaces defined between the batteries in the downstream row of battery cells and that is upstream of the outlet to control the pressure drop in the downstream row of batteries.

The location of the bypass blocker may be changed relative to the second row of battery cells to change the temperature of the fluid mixture or change the relative pressure drop in the rows of battery cells. The location may be a set location for a given battery design configuration. Alternatively, the location of the bypass blocker may be varied dynamically to optimize fluid flow in a battery pack depending upon existing conditions.

These and other aspects of the disclosure will be better understood in view of the attached drawings and the following detailed description of the illustrated embodiment.

DETAILED DESCRIPTION

A detailed description of the illustrated embodiments of the illustrated embodiments is provided below. The illustrated embodiments are examples that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
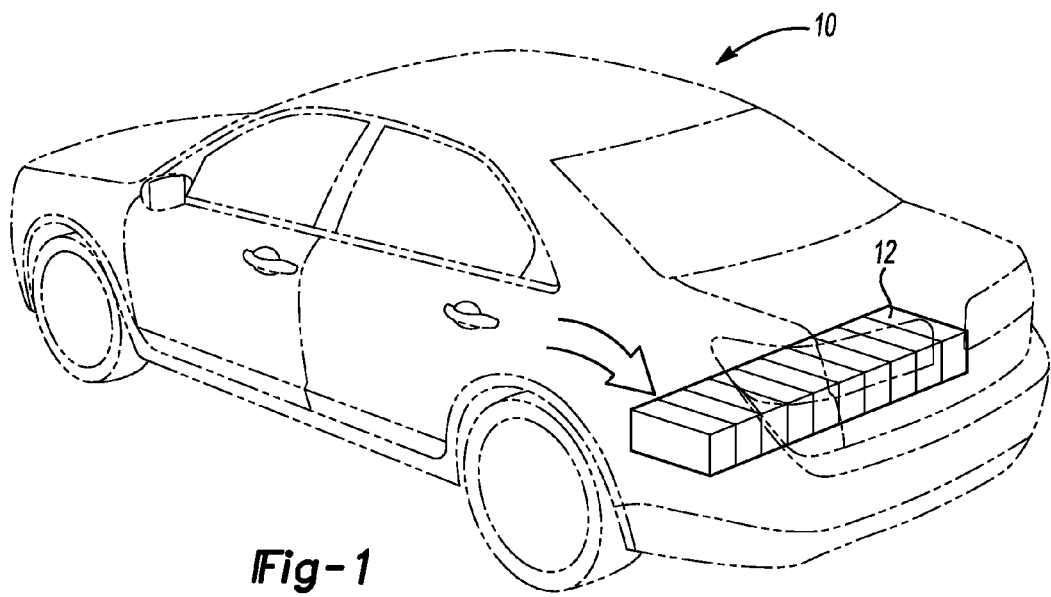
FIG. 1 is a perspective view of an electrically powered vehicle in phantom that has a prismatic battery pack.

Referring to FIG. 1, an electrically powered vehicle is shown in phantom lines with a battery back 12. The electrically powered vehicle 10 may be a plug-in electric vehicle or hybrid electric vehicle. The electric vehicle 10 may include a high voltage electric battery that is depicted in the trunk of the vehicle 10 as the battery pack 12. The battery pack 12 may be located in the front of the vehicle or in another location or in another orientation in the vehicle 10. The battery pack 12 may be a prismatic battery, such as a lithium ion battery, or other type of battery.

References to relative spatial directions in this application are stated in terms of vehicle driving direction with longitudinal direction being the direction that the vehicle 10 is driven, the transverse traction being the cross car direction that is perpendicular to the longitudinal direction and the vertical direction.

Figure 2:
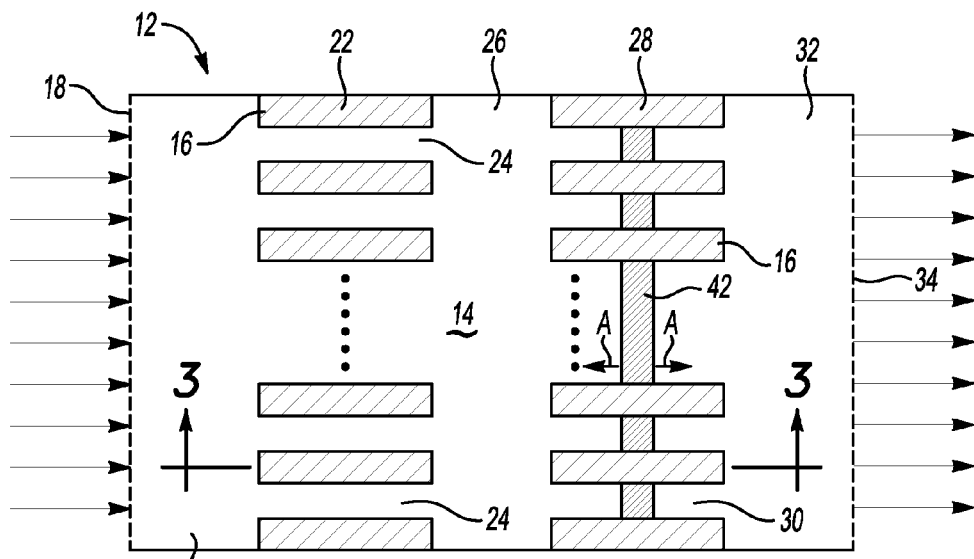
FIG. 2 is a diagrammatic cross-sectional plan view of the prismatic battery pack.

Referring to FIG. 2, the battery pack 12 is shown diagrammatically to include a base 14 that supports a plurality of prismatic battery cells 16. Fluid circulation is provided to the battery pack 12 to cool the battery cells 16 to a fluid inlet 18. In this disclosure, air is the selected heat transfer fluid but it should be understood that other liquid or gaseous heat transfer fluids may be substituted for air. The air provided to the battery cells is preferably obtained from the passenger compartment of the vehicle 10 because it is free of debris and more moderate in temperature in most circumstances. Air is drawn through the battery pack 12 by a fan that draws air through the battery pack. Alternatively, a fan may be used to blow air through the battery pack 12.

The fluid inlet 18 provides fluid to an inlet plenum 20. An upstream 22 or first row of prismatic battery cells 16 is arranged in the transverse vehicle direction with the fluid flow through the battery pack 12 being directed in the longitudinal vehicle direction. A plurality of spaces 24, or fluid passages, are provided between the battery cells 16 in the upstream row 22.

An inner plenum 26 is provided between the upstream row 22 of battery cells and a downstream row 28 of battery cells 16. Spaces 30, or fluid passages, are provided between the battery cells 16 in the downstream row 28. An outlet plenum 32 is provided downstream of the downstream row of battery cells 16. A fluid outlet 34 is provided to allow fluid to pass from the outlet plenum 32.

Figure 3:
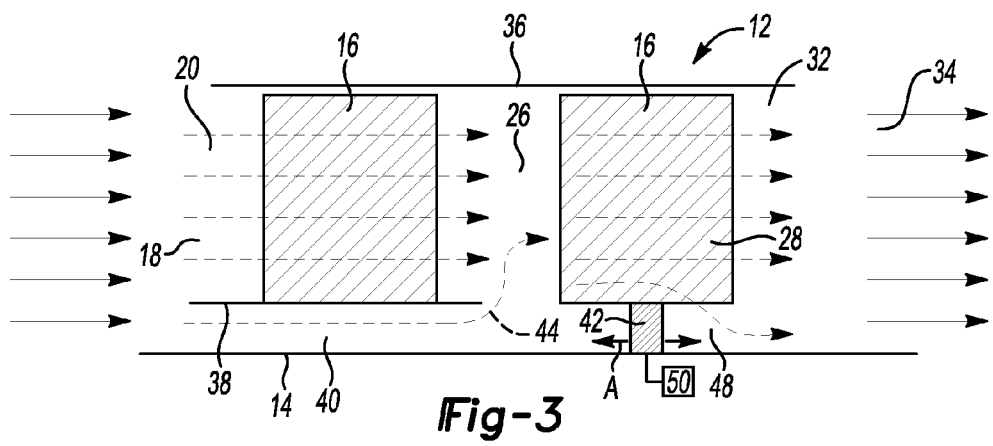
FIG. 3 is a diagrammatic cross-sectional view taken along the line 3-3 in FIG. 2.

Referring to FIG. 3, a top wall 36 is provided that caps the battery pack and prevents fluid flow in a downward direction into the upstream row 22, downstream row 28 or inner plenum 26. A bottom wall 38 may be provided below the upstream row 22. A bypass fluid flow passageway 40 is provided below the upstream row 22 of battery cells 16. The cross-sectional area of the bypass passageway 40 may be varied to provide a greater of lesser volume of fluid flow into the inner plenum. The bypass passageway 40 is defined between the bottom wall 38 and the base 14 of the battery pack 12. Bypass fluid flow 44 is depicted by a dashed line in FIG. 3. The bypass fluid flow 44 flows through the bypass passageway 40 and up into the inner plenum 26.

A bypass blocker 42 extends between the base 14 and the downstream row 28 of battery cells 16. The bypass blocker 42 forces the bypass fluid flow 44 to be directed into the inner plenum 26 and through the downstream row 28 of battery cells 16. A bypass exhaust passage 48 may be defined downstream of the bypass blocker 42. The bypass exhaust passage 48 may be positioned to adjust the pressure drop in the downstream row 28 of battery cells 16. Arrows "A" in FIGS. 2 and 3 are provided to indicate that the bypass blocker may be positioned in a range of positions relative to the downstream row 28 of battery cells 16.

In one embodiment, a drive cylinder 50, or linear drive, may be used to move the bypass blocker 42 relative to the downstream row 28 of battery cells 16. The drive cylinder 50 could be a hydraulic cylinder or a pneumatic cylinder. A motor could also be used to move the bypass blocker 42 with a gear set. Tracks, slots or guide ways may be provided to guide the movement of the bypass blocker as is well known in the art. In general, as the bypass blocker is moved toward the upstream row 22 of battery cells 16, the volume of cooling flow from the bypass fluid flow passageway 40 is reduced and, as a result, the downstream row 28 will tend to be warmer. Conversely, as the bypass blocker is moved away from the upstream row 22 of battery cells 16, the volume of cooling flow from the bypass fluid flow passageway 40 is increased to provide more cool air to the downstream row 28.

In operation, referring to FIGS. 2 and 3, the battery pack 12 is a high voltage battery pack made up of a plurality of prismatic battery cells 16. The battery cells 16 must be heated or cooled for efficient and satisfactory operation. In an electric vehicle the battery pack 12 is cooled by fluid that flows through the fluid inlet 18 into the inlet plenum 20 that is upstream of an upstream row 22 of battery cells 16. Spaces or fluid passages 24 are provided between the battery cells 16. Heat is transferred to the fluid that flows through the spaces 24 to cool the battery cells. Fluid flows from the upstream row 22 into the inner plenum 26. Bypass fluid flow 44 mixes with the fluid from the upstream row 22 into the inner plenum 26 to reduce or increase the temperature of the fluid in the inner plenum before it is directed to the downstream row 28 of battery cells 16. The bypass fluid flow 44 through the bypass passageway 40 also reduces the pressure drop differential between the upstream row 22 and the downstream row 28. The bypass blocker 42 redirects the fluid flow from the bypass passageway 40 into the inner plenum and downstream row 28. The battery cells 16 are arranged in at least two transversely extending rows which, in the illustrated embodiment, are the upstream row 22 and the downstream row 28. Each row has a plurality of battery cells 16 that are arranged in parallel. The battery cells are arranged in series to the extent that fluid flow through the upstream row 22 flows in series to the downstream row 28 of the battery pack 12. Fluid flow through the bypass passageway 40 modifies the temperature and pressure drop through the series/parallel battery pack 12. A bypass exhaust passage 48 may be provided downstream of the bypass blocker 42 to allow some of the fluid in the downstream row 28 to circumvent part of the second row batteries and thereby further control the pressure drop in the downstream row of batteries.

While exemplary embodiments are described above, it is not intended that these embodiments describe all possible forms of the invention. Rather, the words used in the specification are words of description rather than limitation, and it is understood that various changes may be made without departing from the spirit and scope of the invention. In addition, the features of various implementing embodiments may be combined to form further embodiments of the invention.

What is claimed is:

1. A battery pack for a vehicle comprising:
an upstream row of battery cells;
a downstream row of battery cells;
fluid flow channels defined between the battery cells in each of the rows with fluid flowing through the upstream row and the downstream row;
a bypass passageway circumvents the upstream row;
a bypass blocker disposed between a wall of the battery pack and the downstream row redirects fluid to the downstream row; and
a drive cylinder operable to move the bypass blocker relative to the downstream row to control the volume of fluid flowing from the bypass passageway.

2. The battery pack of claim 1 wherein the battery cells are planar members that extend in a vertical plane and a longitudinal plane with the fluid flow channels being defined on two planar sides of the battery cells.

3. The battery pack of claim 1 wherein the fluid is directed from below the upstream row of battery cells into an inner plenum by the bypass blocker disposed below the downstream row of battery cells.

4. The battery pack of claim 1 wherein fluid flowing through the upstream row of battery cells absorbs heat from the battery cells in the upstream row and supplies heated fluid to an inner plenum that is combined with the fluid flowing through the bypass passageway that decreases the temperature of the fluid provided to the downstream row of battery cells.

5. The battery pack of claim 1 further comprising a top wall provided on top of the upstream and downstream rows of battery cells that prevents fluid flow vertically through the battery cells, and a bottom wall provided below the upstream row of battery cells that prevents fluid flow vertically through the upstream row of battery cells, and wherein the bypass blocker is provided below the downstream row of battery cells that directs the fluid through an inner plenum and the downstream row of battery cells by stopping the flow of fluid below the downstream row of battery cells.

6. The battery pack of claim 5 wherein the bypass blocker defines an exhaust passage downstream from the blocker below the downstream row of battery cells that allows a portion of the fluid to circumvent part of the downstream row of batteries.

7. A battery pack for a vehicle comprising:
upstream and downstream rows of cells each defining fluid flow channels interleaved with the cells;
a bypass passageway circumventing the upstream row;
a bypass blocker disposed between a wall of the battery pack and the downstream row to redirect fluid to the downstream row; and
a drive cylinder operable to move the bypass blocker relative to the downstream row of batteries.

* * * * *